(12) United States Patent
Lüchinger et al.

(10) Patent No.: US 8,294,046 B2
(45) Date of Patent: Oct. 23, 2012

(54) ENCLOSURE FOR A LABORATORY BALANCE WITH A SLIDING SIDE WALL MOUNTED SUCH THAT THE TOP GUIDE SLIDING MECHANISM IMPARTS A TURNING MOMENT ON THE LOWER EDGE OF THE WALL TO PRESS IT AGAINST AN ABUTMENT OF THE WEIGHING COMPARTMENT TO FORM A SEAL

(75) Inventors: Paul Lüchinger, Uster (CH); Sandra Ehrbar, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 379 days.

(21) Appl. No.: 12/778,301

(22) Filed: May 12, 2010

(65) Prior Publication Data
US 2010/0288566 A1 Nov. 18, 2010

(30) Foreign Application Priority Data
May 13, 2009 (EP) .................................... 09160140

(51) Int. Cl.
G01G 21/28 (2006.01)
H05K 7/14 (2006.01)
A47F 3/00 (2006.01)
E06B 3/46 (2006.01)

(52) U.S. Cl. .... 177/180; 49/409; 312/138.1; 312/139.2; 312/260; 361/724; 361/727

(58) Field of Classification Search ............ 49/409–411; 361/724–725, 727; 174/520; 312/138.1, 312/139.2, 251, 262, 265.6; 177/180, 181
See application file for complete search history.

(56) References Cited

U.S. PATENT DOCUMENTS

| | | | |
|---|---|---|---|
| 3,896,508 A * | 7/1975 | Doan | 4/557 |
| 3,975,862 A * | 8/1976 | Doan | 49/409 |
| 4,090,265 A * | 5/1978 | Baus | 4/557 |
| 4,700,793 A | 10/1987 | Lüchinger | |
| 6,060,825 A * | 5/2000 | Kim | 313/479 |

(Continued)

FOREIGN PATENT DOCUMENTS
EP 1355032 A2 10/2003
(Continued)

*Primary Examiner* — Randy W Gibson
(74) *Attorney, Agent, or Firm* — Standley Law Group LLP

(57) ABSTRACT

A draft protection device for a laboratory instrument. The device encloses a weighing compartment that surrounds a balance pan. The draft protection device includes a rear wall, a front wall, two sidewalls, a top cover, and a floor that is delimited by border edges. The draft protection device further includes at least one guiding means that is connected to the top cover and serves to guide the movement of at least one horizontally slidable sidewall, and/or a holder means that is connected to the top cover and serves to hold the front wall in place, wherein the guiding means and/or the holder means supports the weight of the at last one sidewall and/or the front wall in such a way that the wall(s) is pushed by a biasing torque against the floor of the weighing compartment. This torque is supported by the border edge facing towards the respective wall.

16 Claims, 7 Drawing Sheets

U.S. PATENT DOCUMENTS

| | | |
|---|---|---|
| 6,603,081 B2 | 8/2003 | Lüchinger |
| 6,686,545 B2 | 2/2004 | Lüchinger et al. |
| 8,067,705 B2 * | 11/2011 | Izumo et al. ............... 177/180 |
| 8,198,553 B2 * | 6/2012 | Durst et al. ............... 177/180 |
| 2002/0038567 A1 | 4/2002 | Luchinger |
| 2002/0040814 A1 | 4/2002 | Luchinger et al. |
| 2002/0040815 A1 | 4/2002 | Luchinger |
| 2006/0016134 A1 | 1/2006 | Luchinger et al. |

FOREIGN PATENT DOCUMENTS

| | | |
|---|---|---|
| FR | 2672482 A1 | 8/1992 |
| JP | 2010-266436 A * | 11/2010 |

* cited by examiner

ENCLOSURE FOR A LABORATORY BALANCE WITH A SLIDING SIDE WALL MOUNTED SUCH THAT THE TOP GUIDE SLIDING MECHANISM IMPARTS A TURNING MOMENT ON THE LOWER EDGE OF THE WALL TO PRESS IT AGAINST AN ABUTMENT OF THE WEIGHING COMPARTMENT TO FORM A SEAL

CROSS-REFERENCE TO RELATED APPLICATIONS

This application is entitled to, and claims, benefit of a right of priority under 35 USC §119 from European patent application 09160140.1, filed on 13 May 2009, the content of which is incorporated by reference as if fully recited herein.

TECHNICAL FIELD

The present invention is directed to a draft protection device for a laboratory instrument. More particularly, the present invention is directed to a draft protection device that includes at least one upright wall and a top cover that together cooperate to enclose a weighing compartment surrounding a balance pan.

BACKGROUND

Laboratory instruments of a kind discussed herein serve, for example, as analytical balances in many fields of industry. Such fields of industry may include, without limitation, laboratories of research and development departments, as well as production areas (e.g., for quality control).

One exemplary analytical balance with a weighing compartment is described in detail in U.S. Pat. No. 4,700,793 A. Generally speaking, analytical balances are balances with a very high resolution of the measurement result. Consequently, even the smallest extraneous factors acting on the object being weighed or on the load receiver of the balance can introduce an error in the weighing result. The extraneous influence factors are rarely stable and this can lead to a situation where the precise weight of the weighing object cannot be determined. To protect the weighing system from being influenced by the environment, a weighing compartment is therefore commonly enclosed with a so-called draft protection device.

As shown in U.S. Pat. No. 4,700,793 A, the typical draft protection device of an analytical balance has in most cases two slidable sidewalls and sometimes also a slidable top cover, as the object to be weighted is normally delivered to the load receiver of the balance from the side, and sometimes also from above. A front wall of the draft protection device is normally rigidly connected to the housing of the balance and, by functioning as a structural support, lends stability to the draft protection device. A draft protection device needs to be as tightly closed and solid as possible, so that air drafts of the ambient atmosphere cannot propagate into the weighing compartment through gaps and openings of the draft protection device and cause atmospheric disturbances in the weighing compartment.

In order to make the weighing compartment, and in particular, the sidewalls of the draft shield easier to clean, a draft shield is proposed in U.S. Pat. No. 6,686,545 B2 whose front wall and sidewalls can be released from a form-fitting seat through a tilting movement and subsequently removed from the balance by a pulling movement. The top cover is connected through a linear guiding constraint to the balance housing, which serves as rear wall. The top cover can be slid horizontally over the balance housing, whereby the draft shield is opened at the top. In addition, the top cover, too, can be separated from the linear guiding constraint by means of a tilting movement.

All of the balances described above are equipped with a draft protection device whose sidewalls are at their top edges and bottom edges guided for horizontal movement along the housing of the draft protection device or of the balance itself. This arrangement has the disadvantage that in spite of all preventive measures, traces of weighed substances can accumulate in the lower guide tracks or guide parts. In order to prevent substances from being spread around, the lower guide tracks or guide parts have to be cleaned periodically with careful attention and at considerable cost.

It would therefore be desirable to provide a draft protection device for a laboratory instrument, wherein at least one openable sidewall thereof works without guiding constraints or guide parts in the area of its bottom edge, and wherein the draft protection device is designed in such a way that in its closed state it is as tight and stable as possible so that air movements of the ambient environment are not transmitted through gaps and openings into the weighing compartment of the instrument.

SUMMARY OF THE GENERAL INVENTIVE CONCEPT

A draft protection device for a laboratory instrument according to the present invention is designed to enclose a weighing compartment that surrounds a balance pan. Such a draft protection device comprises a rear wall, a front wall, two sidewalls, a top cover, and a floor that is delimited by border edges. The draft protection device further comprises at least one guiding means that is connected to the top cover and serves to guide the movement of at least one horizontally slidable sidewall, and/or a holder means that is connected to the top cover and serves to hold the front wall in place, wherein the guiding means and/or the holder means supports the weight of the at last one sidewall and/or the front wall in such a way that they are pushed by a biasing torque against the floor of the weighing compartment. This torque is taken up, or more precisely, supported by the border edge of the floor facing towards the respective sidewall and/or the front wall.

A draft protection device of the present invention protects the weighing compartment of an associated laboratory instrument from the effects of air movements while also overcoming the problems associated with known devices. As the horizontally slidable sidewall is subjected to a biasing torque that is directed against the floor, the side wall is pushed against the border edge of the floor. The contact pressure of the sidewall against the adjacent border edge provides an adequate seal between the sidewall and the adjacent border edge. Neither production tolerances of the parts of the draft protection device nor the property of the top cover to be vertically movable together with at least one wall as described hereinafter can lead to gaping crevices and, thus, to leaks in the draft protection device. Furthermore, with the design according to the present invention for the guiding constraint of the sidewall, the latter is supported in a statically determinate way. Particularly, the fact that the sidewall cannot swing in and out like a pendulum leads to stability of the entire draft protection device. Of course, the same applies analogously to the front wall and its holder means.

To guide the movement of a horizontally slidable sidewall of a draft protection device, a first guide rail and a parallel second guide rail are arranged at the side of the top cover that faces towards the horizontally slidable sidewall. The slidable sidewall further comprises at least one guide element with two recesses in an arrangement where each of the guide rails passes through one of the recesses. The first recess has a guiding contact area and the second recess has a guiding flank arranged so that in the operating state of the draft protection device, the guiding contact area is essentially vertical and lies against the first guide rail, while the guiding flank rests on the second guide rail. The slope angle of the guiding flank relative to vertical is selected so that (1) the weight of the slidable sidewall is supported; and (2) the slidable sidewall, due to its own weight combined with the effect of the guiding contact area as a loose swivel fulcrum, is subjected to a biasing torque that urges the slidable sidewall against the floor of the weighing compartment where said torque is supported by the border edge that faces towards the sidewall.

As a result of its own weight, the sidewall is kept in stable engagement with the guide rails by the guiding flank, the border edge, and the loose swivel fulcrum. Consequently, the larger the downward pull of its own weight, the more resistant the horizontally slidable sidewall will be against being swayed by air movements of the ambient atmosphere.

In order to minimize the friction forces in the opening and closing process of the slidable side wall, there can be at least one guide roller arranged in the guide element, wherein the guide roller contains the guiding flank and/or the guiding contact area.

The use of two guide rails also allows a slidable sidewall to be releasably connected to the top cover. It should be noted that the two recesses do not need to be highly precise bores fitting with the least possible amount of play around guide rails made to the same exacting precision. Thus, the arrangement may include slot-shaped recesses having the aforementioned guide contact area and guiding flank, with one end of each recess being open at a lateral edge of the guide element so that the sidewall can be hooked onto the guide rails. Accordingly, the sidewall is moved essentially in the direction of gravity to hook it onto the guide rails.

In an alternative embodiment, a first guide rail and, extending parallel thereto, a second guide rail, are arranged on the side of the top cover that faces towards the sidewall. The slidable sidewall has at least one guide element that contains at least one rigidly held first guide roller and a second guide roller that is held by a tiltable pivot and biased by an elastic element. The first guide roller on the first guide rail serves to support the weight of the slidable sidewall and to constrain the sidewall against lateral movement, i.e., movement orthogonal to the sliding direction. The slidable sidewall is further elastically biased towards the second guide rail by the tiltable second guide roller and is therefore subjected to a torque which urges the sidewall towards the floor, where the torque is supported by the border edge against the sidewall.

The front wall can likewise have a holder means with similar inventive features. For example, at a border edge of the top cover where the latter meets the front wall, there may be a holder device arranged at each end of said top cover edge, wherein each of the two holder devices has two seating grooves extending parallel to the top cover edge. Further, at both of the corners of the front wall that lie next to the top cover edge, there may be a pin block arranged with two pins extending parallel to the top cover edge. The first seating groove has a pin contact area, and the second seating groove has a pin-guiding flank. In the operating orientation of the associated draft protection device, the pin contact area is oriented essentially vertically, and the first pin lies against the pin contact area. The second pin rests on the pin-guiding flank, wherein the slope angle of the pin-guiding flank relative to the vertical direction is selected so that the weight of the front wall is being supported and that the front wall, due to its own weight together with the function of the pin contact area as a loose swivel fulcrum, is pushed against the floor of the weighing compartment by a biasing torque. This torque is supported by the border edge that faces towards the front wall.

To facilitate cleaning, the connection of the at least one sidewall and/or the front wall to the top cover can be releasable.

Furthermore, there can be at least one locking device arranged in the guide element, which in the operating state hooks partially around at least one of the guide rails so that the guide element can be separated from the guide rails only if the locking device is released.

Given that a draft protection device should as much as possible keep out all air movements that are present in the environment of the laboratory instrument, it is beneficial if a sealing glide strip, sealing brush or sealing roller, is arranged along at least one border edge of the floor to extend at least over the length of the border edge. This serves to seal a possibly existing gap between the border edge of the floor and the sidewall while simultaneously allowing the sidewall to glide smoothly over the border edge. For sidewalls with a particularly damage-prone surface, for example coated glass panels, one could also use a sealing roller which rolls on the sidewall when the latter is moved vertically and which has sufficiently smooth-gliding surface properties for a horizontal movement of the sidewall. Should these measures still be inadequate, one could of course also arrange a supporting roller ball or a row of roller balls along the border edge of the floor, so that independently of the direction of movement there is never a sliding contact movement taking place between the roller balls and the sidewall because the direction of the rotary movement of the roller balls adapts itself to the movement of the sidewall. The gaps between the individual roller balls or the recesses between their contact points with the sidewalls may be sufficiently filled out, for example, with brush segments or sealing strip segments, so that no gap or only an extremely small gap remains between two neighboring roller balls and the sidewall that lies against the roller balls. Leaks in the areas of the vertical edges of the draft protection device, which may occur as a result of angular misalignments of the front wall, the rear wall and the sidewalls in relation to each other, can be closed by arranging soft-elastic sealing lips or brushes in the vertical border areas of these walls.

It is further known in practice that the volume of the weighing compartment can limit the precision of a balance. The reason for this is that the enclosed air in a large weighing compartment is influenced much more strongly by the environment outside of the draft shield, for example by the incoming heat and light radiation. Further, in a large weighing compartment there are, in proportion to the enclosed volume, fewer surfaces slowing the air movement, for example after the sidewall has been closed. It therefore helps if the weighing compartment has a small volume in order for the air inside the weighing compartment to come to rest very quickly. Furthermore, the air in a weighing compartment of limited height is shifted about only to a minimal extent and it takes only a relatively short time for the air inside the weighing compartment to settle into a stable temperature profile over the height of the weighing compartment.

It is therefore advantageous if the top cover and at least one of the two sidewalls and/or the front wall and/or the rear wall are vertically slidable relative to the floor. This is facilitated by the inventive guiding arrangement of the sidewalls, as there are no guiding devices whatsoever in the area of the floor standing in the way of a vertical movement of this kind. It is only necessary that the housing walls of the laboratory instrument which adjoin the border edges of the floor be configured in such a way that the vertically movable walls can slide vertically past those border edges.

There can further be at least one drive mechanism to power the vertical and/or horizontal movement of the wall and/or cover. Preferably however, there is at least one drive mechanism that serves for the vertical movement of the top cover and the wall that is connected thereto, while a further drive mechanism provides the horizontal movement of at least one sidewall. The drive mechanisms may be connected to a control device which that may be operated by a person by way of an input unit.

If a drive mechanism is used for the vertical movement of the top cover or for the height adjustment of parts of the draft protection device, there is preferably a sensor device arranged inside the laboratory instrument whereby at least the height of a receiving container can be detected after being set on the balance pan.

In one possible embodiment, the sensor device can include two laser diodes and two photo cells arranged so that the rays emitted by the two laser diodes cross each other directly below the opening or the delivery orifice of the dosage-dispensing device.

The draft protection device according to the invention can be used in the most diverse kinds of laboratory instruments. The laboratory instrument may be, for example, a balance, a dosage-dispensing instrument, or a pipetting- or titrating device.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
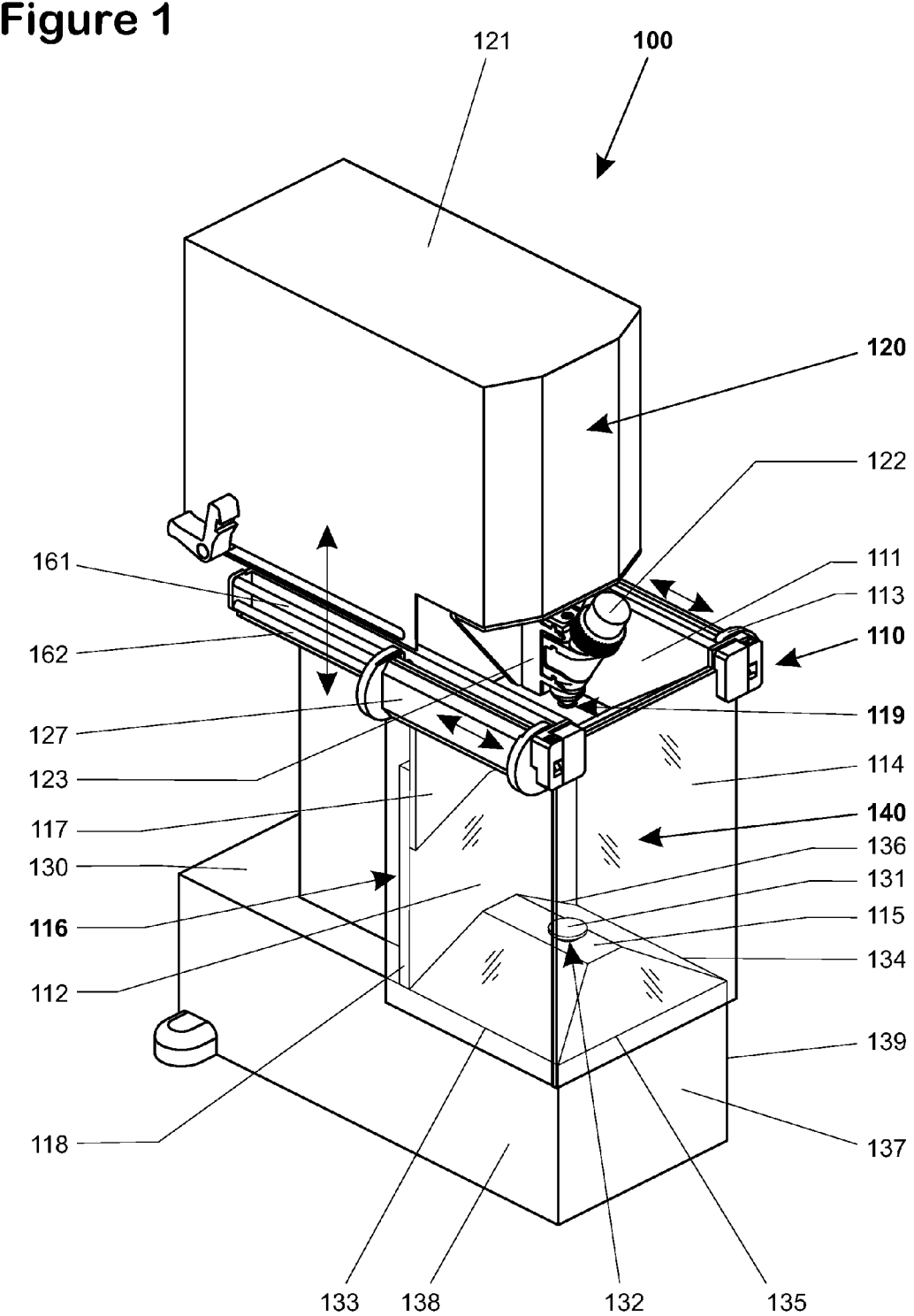
FIG. 1 is a three-dimensional view of a laboratory instrument with a dosage-dispensing device, and with a first exemplary embodiment of a draft protection device according to the present invention having a vertically movable top cover to which both sidewalls, the front wall and a part of the rear wall are connected, wherein the illustrated position of the top cover corresponds to its largest possible distance from the floor.

FIG. 1 shows one exemplary embodiment of a laboratory instrument 100 with a dosage-dispensing device 120 and with a draft protection device 110 according to the present invention. The draft protection device 110 includes a top cover 111, a floor 115 delimited by border edges 133, 134, 135, 136, a first sidewall 112 and a second sidewall 113, a front panel 114 and a divided rear wall 116. The draft protection device 112 encloses a weighing compartment 140.

The draft protection device 110 is shown in FIG. 1 in a closed state, and since the sidewalls 112, 113 and the front wall 114 are made of transparent material, the view into the weighing compartment 140 enclosed by the draft protection device 110 is free from three sides. Both of the sidewalls 112, 113 are slidable relative to the top cover 111 in a linear horizontal movement.

The first sidewall 112 is equipped with a guide element 127 which is guided in linear movement along a first guide rail 161 and a second guide rail 162 that runs parallel to the first guide rail. Both of the guide rails 161, 162 are solidly connected to the top cover 111. In an analogous arrangement, the second sidewall 113 is equipped with a guide element that is horizontally guided on corresponding guide rails that are connected to the top cover 111. Due to the configuration of the guide rails 161, 162, the horizontally slidable sidewalls 112, 113 are held in a vertical position and pushed by a biasing torque against the floor 115, so that the surface area of the sidewall 112, 113 that faces towards the border edge 133, 134 is always resting against the adjacent border edge 133, 134. As a result, the draft protection device forms a nearly leak-free enclosure, independent of the distance of the top cover 111 from the floor. Furthermore, as the sidewalls 112, 113 are pushed against the floor by the biasing torque they cannot be swayed by the air drafts from the ambient environment that could cause air movements in the weighing compartment 140 and make it impossible to capture a weighing result.

The floor 115 is solidly connected to a console housing 130 of the laboratory instrument 100. Inside the console housing 130 is arranged a weighing cell (not shown in the drawing) whose load-receiving part is connected by means of a load-transmitting element (not shown) to a balance pan 131 that is arranged above the floor 115 and, thus, inside the weighing compartment 140. As shown, the floor 115 slopes down from its center towards the two sidewalls 112, 113 and the front wall 114. This does not preclude the possibility that individual surface areas of the floor 115 could also extend horizontally, as is shown in FIG. 1. The center of the floor 115 has a passage opening 132 to allow the load-transmitting element (not visible because of the balance pan 131) to pass through the floor 115 into the weighing compartment 140.

Like the floor 115, the top cover 111 is also comparably designed in the shape of a truncated pyramid, but in an inverted position. In place of the passage opening 132, the top cover 111 has an opening 119. This opening 119 can be adapted to a dosage-dispensing head 122 as described herein farther below.

The divided rear wall 116 extends in its width over the entire adjacent border edge 136 of the floor 115 and includes a first rear wall panel 117 and a second rear wall panel 118, wherein the first rear wall panel 117 is solidly connected to the top cover 111 and the second rear wall panel 118 is solidly connected to the floor 115 and to the console housing 130. The two rear wall panels 117, 118 are arranged in such a way relative to each other that their surfaces lie against each other and the panels partially overlap, but are nevertheless vertically movable relative to each other.

The top cover 111 and the walls connected thereto are slidable in the vertical direction relative to the console housing 130. For this to be possible, it is necessary that the front wall 114 and the two sidewalls 112, 113 can be moved vertically past the respectively adjacent border edges 133, 134, 135 of the floor 115 and past the housing walls 137, 138, 139 that adjoin the border edges. The housing walls 137, 138, 139 of the console housing 130 are therefore preferably designed as vertical surfaces, with the sidewalls 112, 113 and the front wall 114 partially overlapping the housing walls 137, 138, 139 in order to achieve a draft-tight weighing compartment. The height of the console housing 130 preferably substantially matches the vertical displacement height of the top cover 111 relative to the floor 115 or relative to the balance pan 131. If a supporting surface (not shown) for the laboratory instrument 100, for example a laboratory table, has suitable recesses to receive the front wall 114 and the sidewalls 112, 113 when the top cover 111 is moved downward, one could also choose a lower height for the console housing 130.

The dosage-dispensing device 120 has a drive and control unit (not shown) that is arranged in a dosage-dispensing device housing 121. A dispensing head 122 is releasably mounted in a dispensing head holder 123 of the dosage-dispensing device 120 and can be coupled to the drive and control unit. Further, a part of the dispensing head 122 reaches through the opening 119 into the weighing compartment 140. The opening 119 is matched to the corresponding profile section of the dispensing head 122, which is located in the area of the opening 119 when the dispensing head 122 is set into the dispensing head holder 123. This serves to prevent air drafts of the ambient atmosphere from entering through the opening 119 into the weighing compartment 140. Depending on the design of the dispensing head 122 and the opening 119 in the top cover 111, it may also be possible to do without the dispensing head holder 123.

Preferably, at least the dispensing head 122 or, as shown in FIG. 1, the entire dosage-dispensing device 120, is therefore connected to the top cover 111 and follows the vertical movements of the top cover 111. The position of the top cover 111 shown in FIG. 1 corresponds to the largest possible distance from the floor 115.

Figure 2:
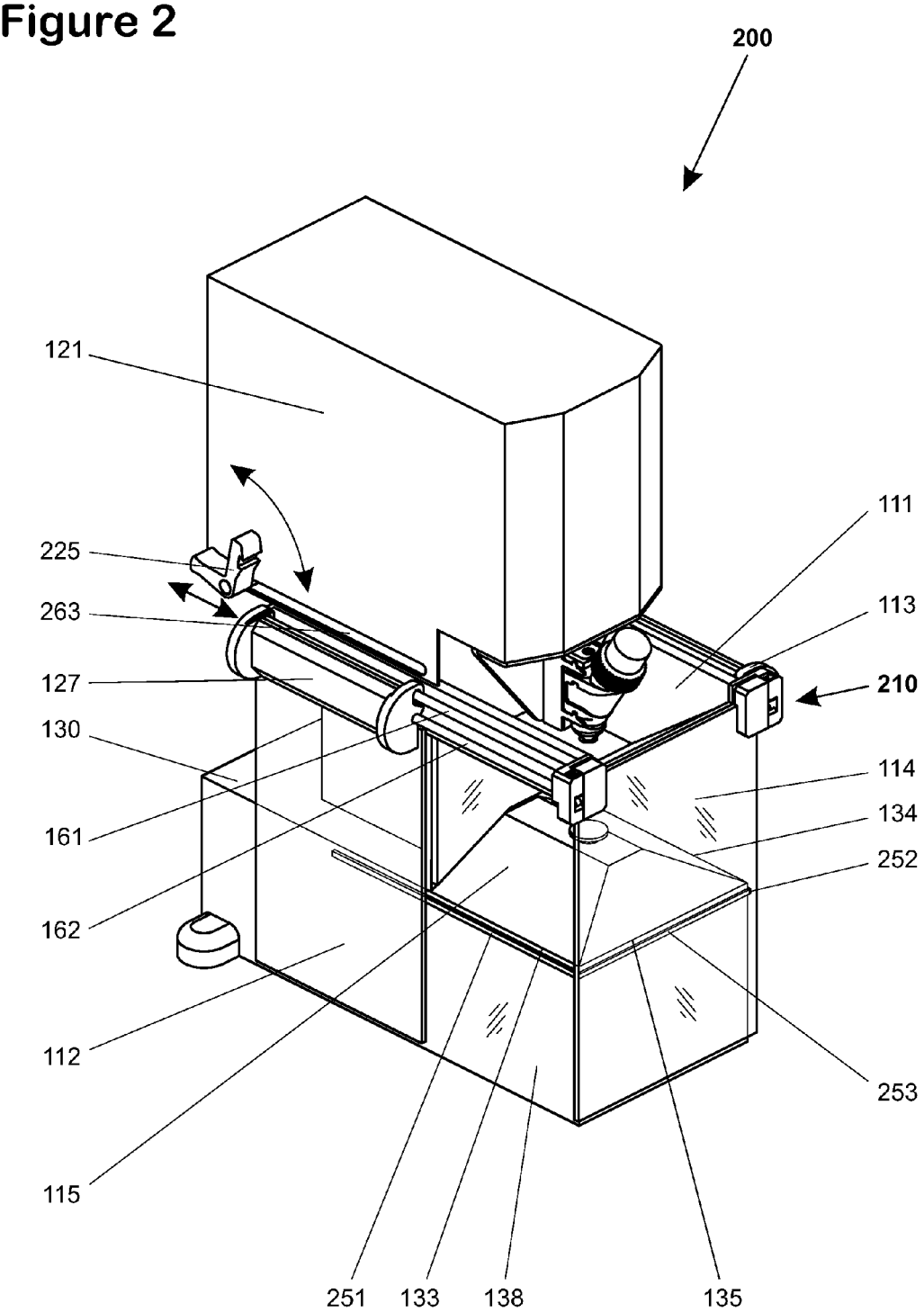
FIG. 2 shows the laboratory instrument of FIG. 1 with one sidewall opened, wherein the illustrated position of the top cover corresponds to its smallest possible distance from the floor.

FIG. 2 shows the laboratory instrument 200 which is almost completely identical to the laboratory instrument 100 of FIG. 1. Unlike in FIG. 1, the draft protection device 210 of the laboratory instrument 200 in FIG. 2 is shown with the first sidewall 112 in the open state, and the position of the top cover 111 corresponding to the smallest possible distance from the floor 115.

As the draft protection device 210 of the laboratory instrument 200 should to the largest possible extent block all ambient air movements that occur around the laboratory instrument 200, the border edge 133 that faces towards the first sidewall 112 may be equipped with a first sealing glide strip 251. Likewise, there is a second sealing glide strip 252 may be arranged between the second sidewall 113 and the adjacent border edge 134, and a third sealing glide strip 253 may be arranged between the front wall 114 and the adjacent border edge 135. As shown in FIG. 2, the first sealing glide strip 251 that is in contact with the first sidewall 112 extends almost over the entire length of the first housing wall 138 of the console housing 130. This sealing strip serves to seal a possible gap between the border edge 133 of the floor 115 and the first sidewall 112 and to allow a smooth gliding movement of the first sidewall 112 relative to the border edge 133, so that the first sidewall 112 is not being scratched.

FIG. 2 further shows a first take-along latch 225 in the shape of an angled lever. The take-along latch can be moved along a linear path that is formed by a slot 263 in the dosage-dispensing device housing 121 and runs parallel to the guide rails 161, 162. This linear movement occurs by means of a drive mechanism (not shown) which is arranged inside the dosage-dispensing device housing 121. This drive mechanism will be covered below in more detail within the context of FIG. 7. The first take-along latch 225 can be coupled to the guide element 127 through a simple swivel movement, whereby the linear movement of the first take-along latch 225 is imparted to the first sidewall 112. Analogously, there can be a second take-along latch for the second sidewall 113, in which case both take-along latches are moved synchronously by the drive mechanism. When it is not coupled to the first take-along latch 225, the first sidewall 112 can be moved manually.

Figure 3:
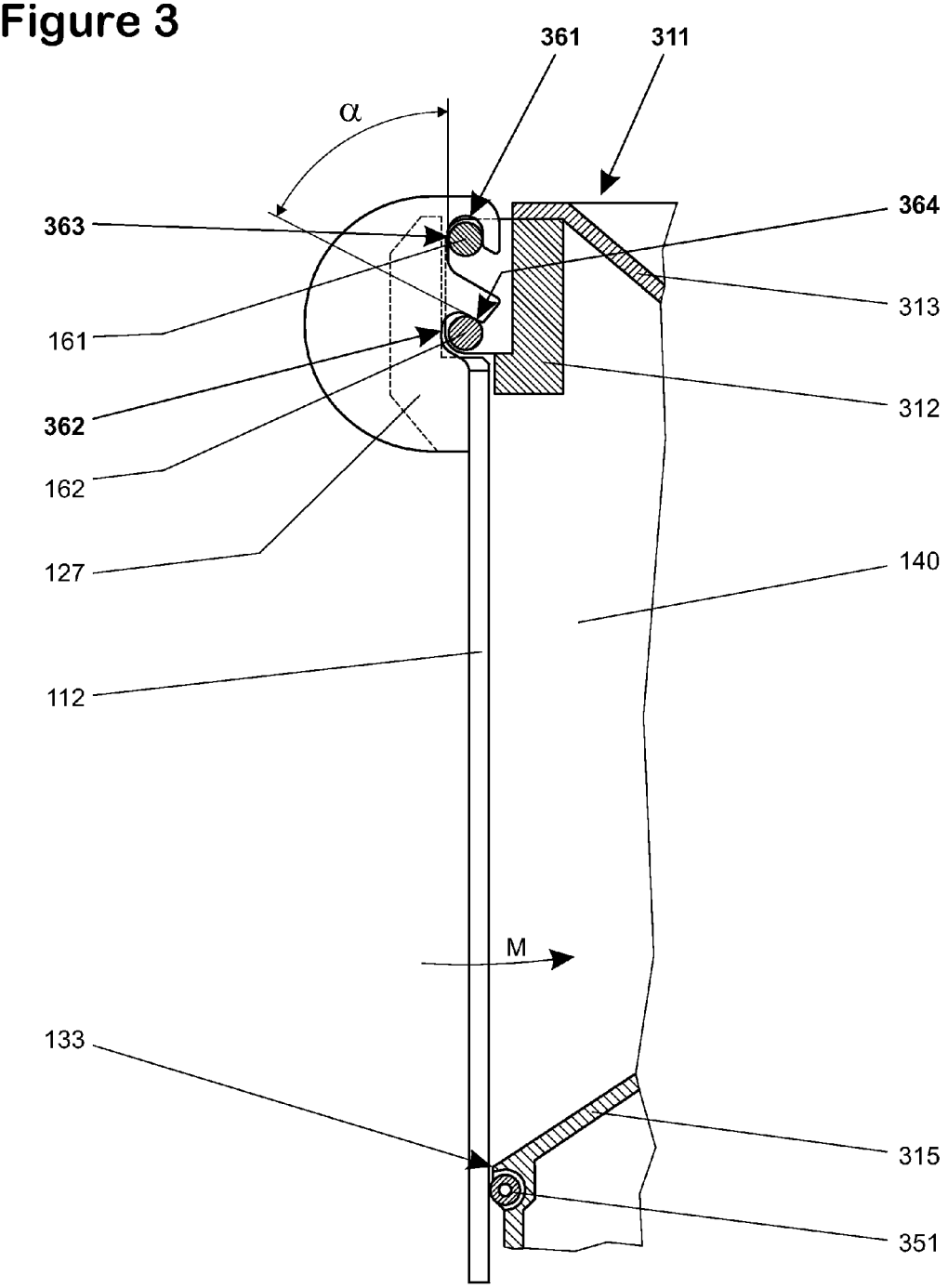
FIG. 3 is a detail view of a slidable sidewall, with associated guide rails as well as part of the instrument weighing compartment, the top cover and the floor, shown in cross-section.

FIG. 3 presents a detail view of the slidable sidewall 112 and part of the weighing compartment 140, with the top cover 311, the floor 315 and the guide rails 161, 162, shown in cross-section. The top cover 311 is divided into a top cover frame 312 and a top cover insert 313, so that the top cover insert 313 can be easily separated from the top cover frame 312 for cleaning.

The guide element 127, which is arranged on the slidable sidewall 112, has a first recess 361 and a second recess 362. Running perpendicular to the plane of the drawing, the first guide rail 161 and the second guide rail 162 are engaged, respectively, in the first recess 361 and the second recess 362. At the first recess 361, a guiding contact area 363 is formed which, in the operating orientation of the draft protection device, is oriented essentially vertical and rests against the first guide rail 161. The second recess 362 has a guiding flank 364 which rests on the second guide rail 162. The slope angle $\alpha$ of the guiding flank 364 relative to the guiding contact area, i.e., to the vertical, is selected so that in the operating state of the draft protection device, the weight of the slidable sidewall 112 is supported and the slidable sidewall 112, due to its own weight together with the guiding contact area 363 acting as a loose swivel fulcrum, is subjected to a biasing torque M which pushes the sidewall against the floor 315. This torque M is supported by the border edge 133 that faces towards the sidewall 112, more specifically by a sealing roller 351 that is arranged in the area of the border edge 133.

The forces that act on and support the slidable sidewall 112 are shown in the schematic diagram of FIG. 4 and will be explained in detail below. The sidewall 112 of FIG. 3, reduced here to its essential functional outline, has a mass which for the sake of simplicity is assumed to be concentrated in the mass center of gravity S. Accordingly, the sidewall 112 is subjected to the weight force $F_m$ whose point of application is the mass center of gravity S. As described in the context of FIG. 3 and graphically indicated in FIG. 4, the weight force $F_m$ is supported by the guiding flank 364 resting on the second guide rail 162, according to the equilibrium condition:

$$F_{AY}=F_m,$$

wherein $F_{AY}$ stands for the vertical component of the contact force on the guiding flank.

Since the guiding flank 364 is inclined at a slope angle α relative to the guiding contact area 363, the resultant contact force $F_{Res}$, which is perpendicular to the guiding flank 364, is obtained as:

$$F_{Res}=F_{AY}/\sin(\alpha)$$

Accordingly, there is also a horizontal force component $F_X$ acting on the sidewall, according to the equation:

$$F_X=F_{AY}/\tan(\alpha)$$

Due to this horizontal force component $F_X$, the guiding contact area 363 is pressed against the first guide rail 161 at a rail distance h and thus subjected to a first horizontal reaction $F_{AX1}$. As shown in FIG. 4, this results in a torque M that urges the sidewall 112 against the floor 315, according to the equation:

$$M=F_X \times h - F_m \times d$$

Figure 4:
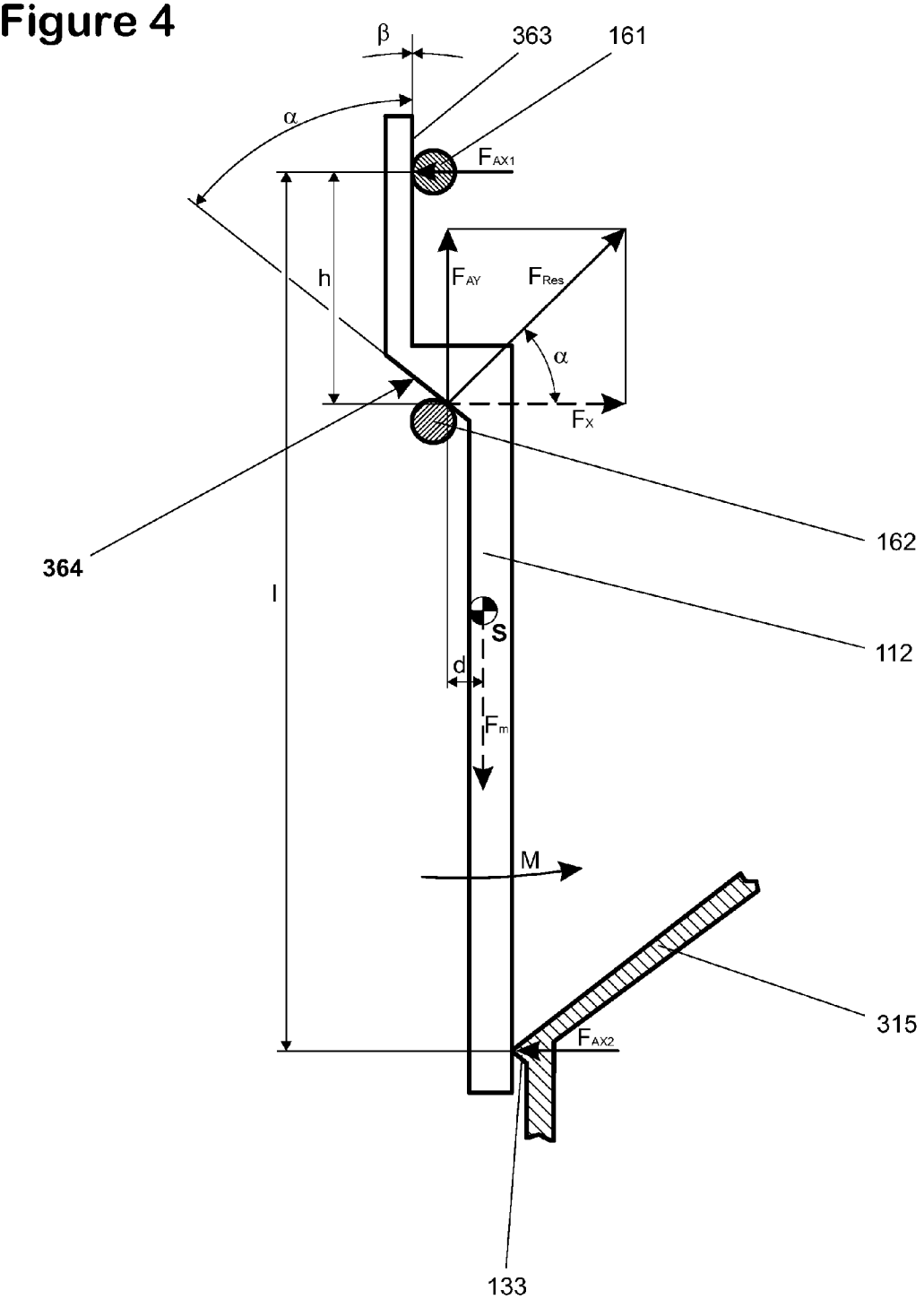
FIG. 4 schematically illustrates the slidable sidewall of FIG. 3, including the forces that act on and support the side wall.

As can be concluded from the position of the center of gravity S in FIG. 4, the torque M is reduced in magnitude by the effect of the weight force $F_m$ acting in the center of gravity S at a distance d from the second guide rail 162. Of course, by shifting the center of gravity S to the other side of the second guide rail 162, the torque M could also be increased.

It is further evident that the slope angle α between the guiding flank 364 and the guiding contact area 363, as well as the alignment angle β of the guiding contact area 363 in relation to the weight force $F_m$, is an important factor for the distribution of forces between the contact forces on the first guide rail 161 and those on the second guide rail 162. With an alignment angle β=0° in the present example, the guiding contact area 363 is oriented vertically. Of course, an angle of alignment β≧0° is also possible, but always subject to the condition that it results in a torque M which pushes the sidewall 112 against the floor 315. In this case, however, the positions of the guide rails 161, 162 and the border edge 133 in relation to each other as well as the slope angle α and the alignment angle β will have to be matched to each other with high precision.

The biasing torque M is supported by the border edge 133, which gives rise to a second horizontal reaction $F_{AX2}$ with a magnitude of:

$$F_{AX2}=M/I$$

and a first horizontal reaction:

$$F_{AX1}=F_X-F_{AX2}.$$

The border edge distance I is the distance of the border edge 133 from the first guide rail 161.

The above equations illustrate how for a given mass, i.e., a known weight force $F_m$, the first horizontal reaction $F_{AX1}$ and the second horizontal reaction $F_{AX2}$ can be influenced through the selection of the slope angle α as well as the distances d, h and I. It is important to know the magnitude of these forces because sliding friction of the slidable sidewall 112 has a significant influence on the design of the drive mechanism, the ease of manual operation, and the abrasion that occurs in the contact areas of the sidewall 112 with the first guide rail 161, the second guide rail 162 and the border edge 133. Accordingly, the slope angle α can be matched specifically to the abrasion resistance of the materials that are subjected to the sliding friction, while the stability of the sidewall 112 to withstand air drafts is not unnecessarily reduced.

Figure 5:
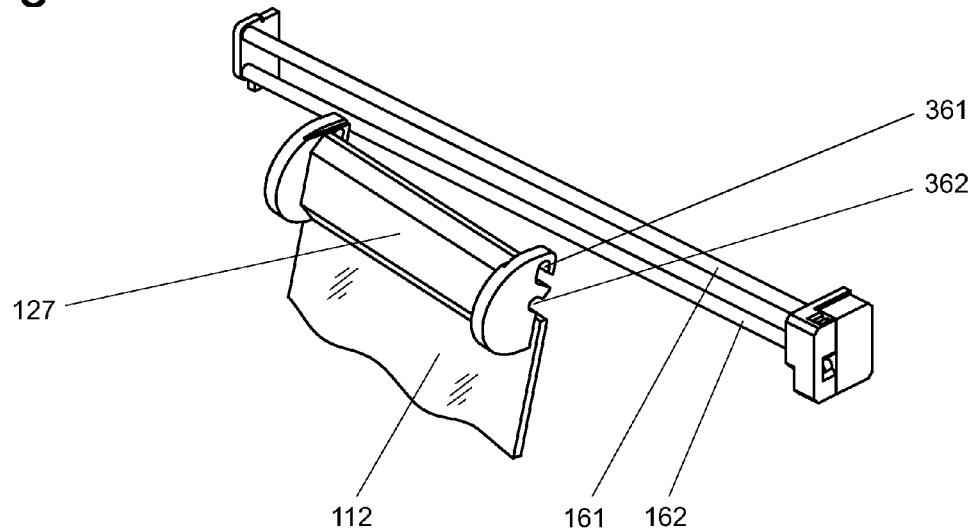
FIG. 5 is a three-dimensional detail view of a releasable sidewall attachment.

FIG. 5 shows a three-dimensional detail view of a releasable sidewall attachment of the kind that has already been illustrated (without a verbal description) with the first sidewall 112 in the preceding figures. The guide element 127 includes the first recess 361 and the second recess 362, which are slot-shaped and oriented against the direction of gravity so that the first sidewall 112 can be hooked onto the first guide rail 161 and the second guide rail 162. The two guide rails 161, 162 lend stability to the suspended sidewall 112, allowing the latter only to slide horizontally along the guide rails 161, 162 as well as to be released from the guide rails 161, 162 through a swiveling and pulling movement against the direction of gravity.

Figure 6:
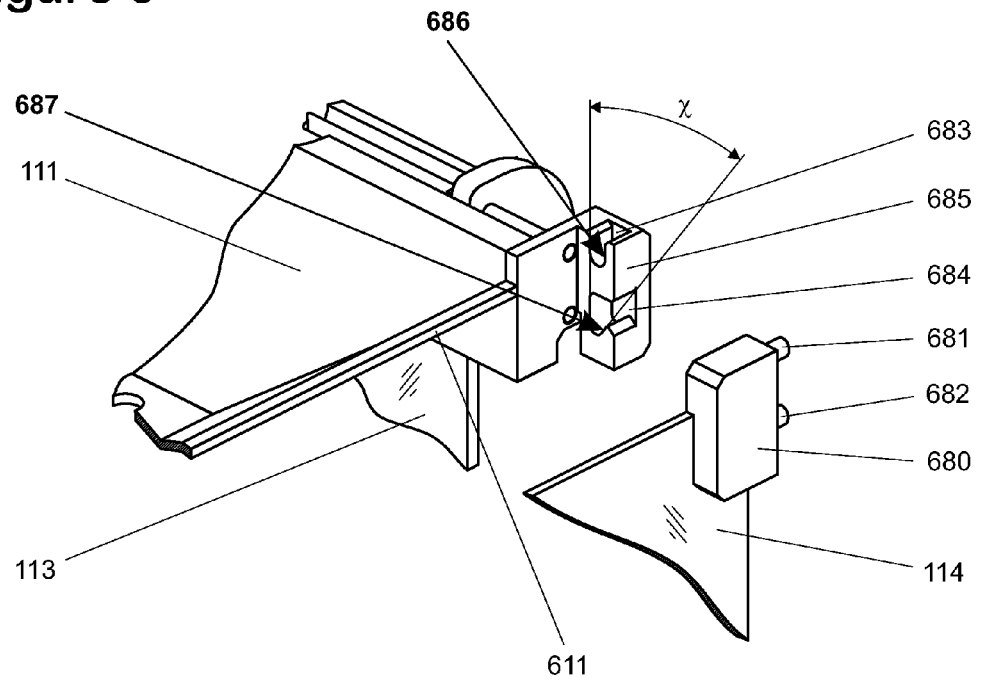
FIG. 6 is a three-dimensional detail view of a releasable front wall attachment.

FIG. 6 shows a three-dimensional detail view of a releasable sidewall attachment of the kind that has already been illustrated (without a verbal description) in FIG. 1. For the sake of clarity, only fragmentary portions are shown of the top cover 111, the top cover border edge 611, the second sidewall 113, and of the front wall 114, which is separated from the top cover 111. To provide a releasable connection between the front wall 114 and the top cover 111, and in keeping with the inventive concept of a torque that pushes the front wall 114 against the floor, the corners of the front wall 114 that lie next to the top cover 111 carry pin blocks 680, each equipped with a first pin 681 and a second pin 682. The two pins 681, 682 can be engaged, respectively, in a first groove 683 and a second groove 684, which are formed in a holder 685. One of these holders 685 is arranged at each of the corners of the top cover border edge 611 that face towards the front wall 114. A front wall 114 that is equipped with this front wall fastening arrangement can be released from or attached to the holders 685 with a single hand movement.

As shown in FIG. 6, the first groove 683 has parallel vertical sides that serve as pin-guiding areas 686. The second groove 684 has among other features a pin-guiding flank 687 arranged at a pin-guiding flank angle χ relative to the vertical. As has already been described in detail within the context of FIG. 4 with regard to the example of the sidewall 113, as a result of the inventive configuration of the first groove 683 and the second groove 684, the installed front wall 114 is subjected to a torque which biases the front wall 114 against the floor. This torque is countered by the reactive force of the border edge of the floor. Accordingly, the arrangement with two pins 681, 682 and two grooves 683, 684 secures a stable, aligned position of the front wall 114 relative to the top cover 111 without allowing the front wall to swing like a pendulum in the holders 685.

Figure 7:
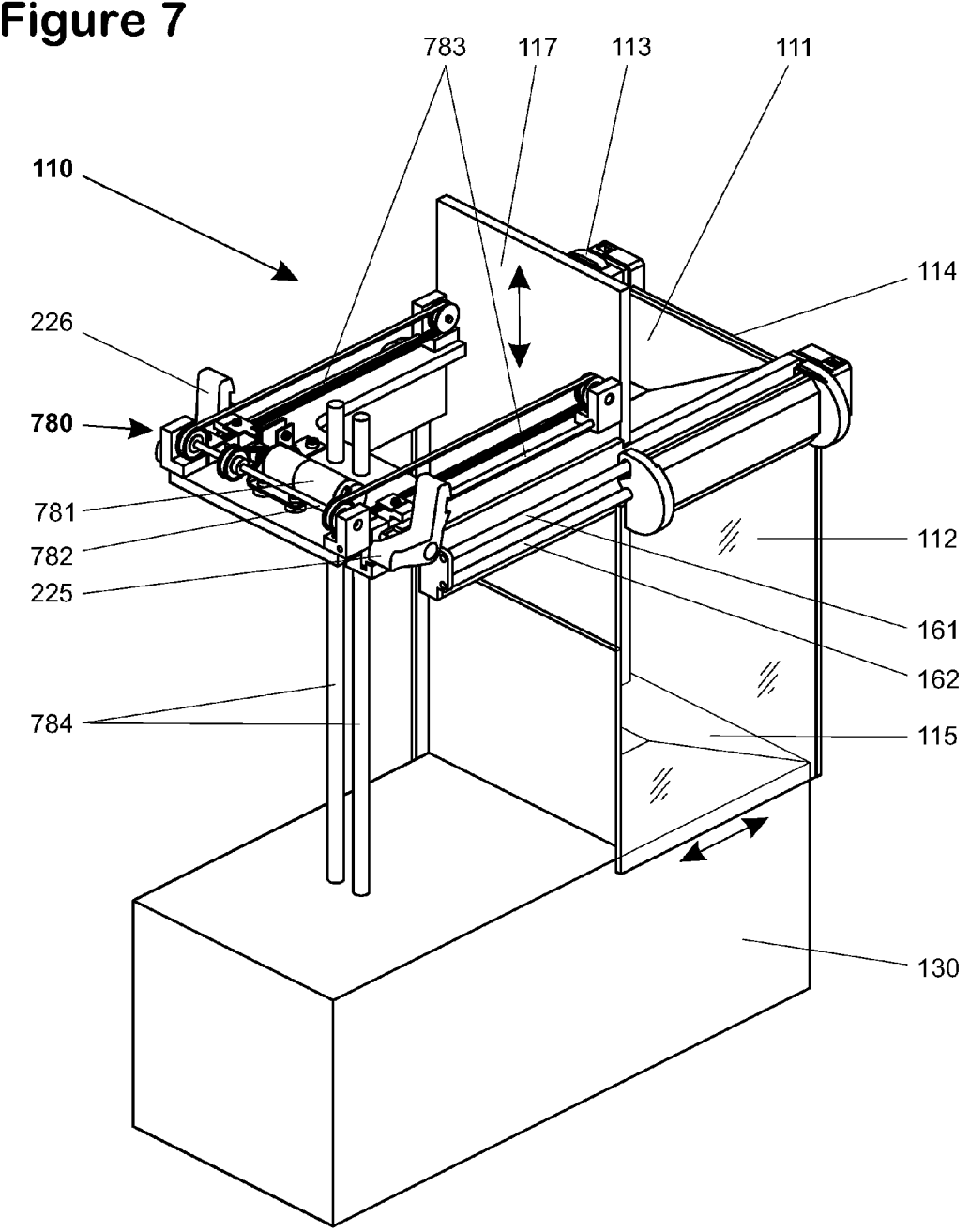
FIG. 7 is a three-dimensional representation of an exemplary draft protection device according to the present invention having a drive mechanism for both sidewalls and two linear guides for directing the vertical movement of the top cover and the walls.

In FIG. 7, the draft protection device 110 according to the invention, which is identical to the draft protection device 110 of FIG. 1, is shown in a three-dimensional view from the rear. All of the enclosure panels and the entire dosage-dispensing device have been omitted in order to focus on a few details of the drive mechanism 780 that have been mentioned above. Only the console housing is shown again here to better illustrate the vertical guide arrangement of the top cover 111 with the two sidewalls 112, 113 and the front wall 114 that are connected thereto, as the console housing 130 forms at the same time the base of the floor 115. The drive mechanism 780 has a motor 781 whose movements are transmitted by way of a toothed belt drive 782 to the first take-along latch 225 and a second take-along latch 226. Both take-along latches 225, 226 are guided on longitudinal guiding constraints 783 that run parallel to the guide rails 161, 162 of the horizontally slidable sidewalls 112, 113 and can be coupled independently of each other to their respective associated sidewalls 112, 113.

Furthermore, two vertical guides 784 are shown schematically in FIG. 7 in order to illustrate the vertical mobility of the top cover 111, as well as the elements connected thereto, i.e., the sidewalls 112, 113, the front wall 114, the first rear wall panel 117 and the drive mechanism 780. Of course, the draft protection device 110 also has a drive source for vertical movement, but for the sake of clarity this drive source is not shown here.

Figure 8:
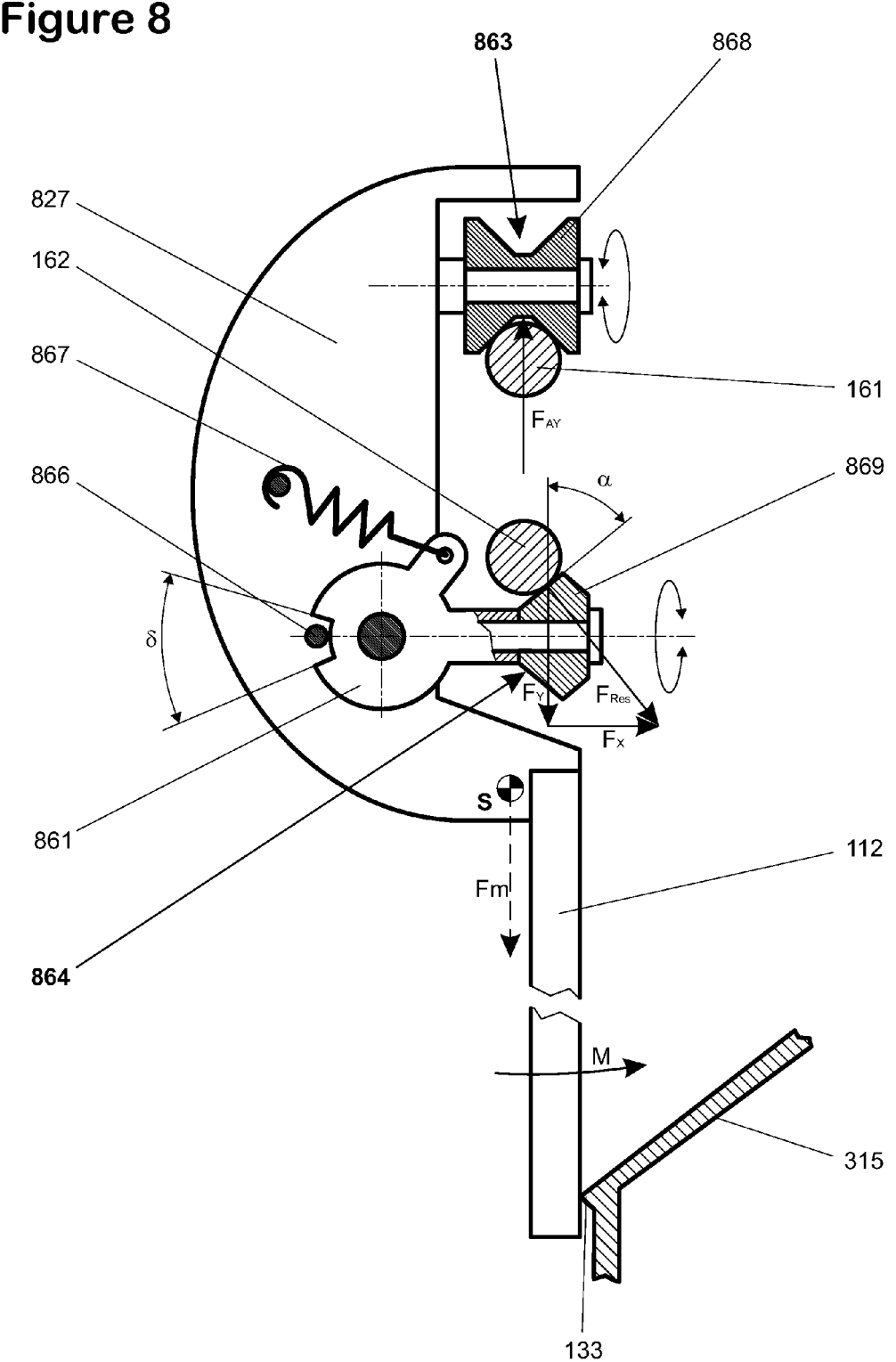
FIG. 8 is a detail view of the guide element and the first and second guide rails shown in cross-section, wherein the guide element includes a rigidly supported first guide roller and a second guide roller that is supported in the guide element by a tiltable pivot.

FIG. 8 is a detail view of the guide element 827, with the first and second guide rails 161, 162 shown in cross-section. Instead of a rigid guiding contact area, the guide element 827 includes a rigidly supported first guide roller 868. The guide roller 868 has a V-shaped groove 863 encircling its circumference, which groove rides on the first guide rail 161 when the guide element is in place on the guide rail. Thus, the weight force $F_m$, which represents the combined weight of the guide element 827 and the sidewall 112 that is connected thereto, is supported by the guide rail. In addition, the V-groove 863 laterally constrains the guide element 827. Further, instead of a rigid guiding flank, the guide element 827 has a second guide roller 869 carrying the guiding flank 864.

This arrangement significantly reduces the frictional resistance when the sidewall 112 is slid along the guide rails 161, 162. The guide roller 869 turns on a tiltable pivot 861 whose axle can swivel up and down within a tilt angle $\delta$ that is delimited by boundaries, with a tension spring 867 biasing the tiltable pivot 861 against a stop 866 when the guide element 827 is not seated on the guide rails 161, 162. In order to seat the guide element 827 on the guide rails 161, 162, the guide roller 869 needs to be tilted to open the space between the two guide rollers 868, 869 wide enough for them to snap into engagement with the guide rails. When the guide element 827 is set in place as shown in FIG. 8, the tiltable pivot 861 is released from the stop 866 and the spring force exerted by the spring element 867 acts on the second guide rail 162. Due to the guiding flank 864 being sloped at an angle $\alpha$ and cooperating with the spring force, a resultant contact force $F_{Res}$ occurs at the guide rail 162, which can again be broken up into a horizontal vector component $F_X$ and a vertical vector component $F_Y$. Since the vertical component $F_Y$ has the same direction as the gravity force $F_m$, the vertical supporting force is $F_{AY}=F_m+F_y$. As explained above in reference to FIG. 4, the horizontal force component $F_x$ gives rise to a torque M that is supported at the border edge 133 of the floor 315.

LIST OF REFERENCE SYMBOLS USED HEREIN

- 200, 100 laboratory instrument
- 210, 110 draft protection device
- 311, 111 top cover
- 112 first sidewall
- 113 second sidewall
- 114 front wall
- 315, 115 floor
- 116 rear wall
- 117 first rear wall panel
- 118 second rear wall panel
- 119 opening
- 120 dosage-dispensing device
- 121 dosage-dispensing device housing
- 122 dispensing head
- 123 dispensing head holder
- 827, 127 guide element
- 130 console housing
- 131 balance pan
- 132 passage opening
- 133 border edge facing the first sidewall
- 134 border edge facing the second sidewall
- 135 border edge facing the front wall
- 136 border edge facing the rear wall
- 137 third housing wall
- 138 first housing wall
- 139 second housing wall
- 140 weighing compartment
- 161 first guide rail
- 162 second guide rail
- 225 first take-along latch
- 226 second take-along latch
- 251 first sealing glide strip
- 252 second sealing glide strip
- 253 third sealing glide strip
- 263 slot
- 312 top cover frame
- 313 top cover insert
- 351 sealing roller
- 361 first recess
- 362 second recess
- 363 guiding contact area
- 864, 364 guiding flank
- 611 border edge of top cover
- 680 pin block
- 681 first pin
- 682 second pin
- 683 first groove
- 684 second groove
- 685 holder
- 686 pin-guiding area
- 687 pin-guiding flank
- 780 drive mechanism
- 781 motor
- 782 toothed belt drive
- 783 longitudinal guide
- 784 vertical guide
- 861 tiltable pivot
- 863 groove
- 866 stop
- 867 tension spring
- 868 first guide roller
- 869 second guide roller
- $\alpha$ slope angle
- $\beta$ alignment angle
- $\chi$ pin-guiding flank angle
- $\delta$ tilt angle
- S center of gravity
- $F_m$ weight force
- $F_{AY}$ vertical reaction force
- $F_{AX1}$ first horizontal reaction component
- $F_{AX2}$ second horizontal reaction component
- $F_{Res}$ resultant force vector
- $F_x$ horizontal force vector component
- $F_y$ vertical force vector component
- h distance between rails
- d distance from the center of gravity
- I border edge distance
- M torque Although the invention has been described by presenting specific examples of embodiments, it is considered obvious that numerous further variant embodiments can be created from a knowledge of the present invention, for example by combining the features of the individual embodiments with each other and/or interchanging individual functional units of the embodiments described in the examples. Among other possibilities, alternative embodiments of the inventive concept are possible where, for example, the guiding contact area, too, is formed on a guide roller that can tilt in the guide element, or where a sidewall is equipped with a holder means analogous to the front wall. Of course, sidewalls that are vertically divided into two or more segments could also be equipped with the guiding means according to the invention, so that in each of the individual segments the weight force and the counteracting support force together produce a torque that pushes the sidewall segment towards the floor. Furthermore, the sidewall or front wall can also be connected by means of an articulated joint to the guiding means or holder means, wherein the torque can be produced by a spring element in the articulated joint. Also, the guide rails could be arranged at the slidable sidewall and the guide element at the top cover, the front wall or the rear wall. As a further possibility the guide element, instead of being formed of one piece, could also consist of several components.

Therefore, while certain embodiments of the present invention are described in detail above, the scope of the invention is not to be considered limited by such disclosure, and modifications are possible without departing from the spirit of the invention as evidenced by the following claims:

What is claimed is:

1. A draft protection device for a laboratory instrument, the device enclosing a weighing compartment surrounding a balance pan and comprising:
    a rear wall;
    a front wall;
    two sidewalls, at least one of which is horizontally slidable;
    a top cover;
    a floor delimited by border edges;
    at least one guiding means connected to the top cover, the guiding means serving to guide a slidable sidewall during a horizontal sliding movement thereof and supporting the weight of the slidable sidewall in such a way that the slidable sidewall is pushed by a biasing torque against the floor and said torque is supported by the border edge of the floor that faces the respective slidable sidewall.

2. The draft protection device of claim 1, wherein the guiding means further comprises:
    a first guide rail and, running parallel thereto, a second guide rail, the guide rails arranged on the side of the top cover that faces the slidable side wall; and
    at least one guide element on the slidable sidewall, the guide element including two recesses, a first recess having a guiding contact area and a second recess having a guiding flank;
    wherein the guide rails and guide elements are arranged such that each of the guide rails on the top cover passes, respectively, through one of the recesses in the guide element; and
    wherein, in the operating state of the draft protection device, a guiding contact area is oriented substantially in the vertical direction and rests against the first guide rail, while a guiding flank rests on the second guide rail and is oriented at a slope angle relative to the vertical, said slope angle being selected so that:
        (a) the weight of the slidable sidewall is supported, and
        (b) the slidable sidewall, due to its own weight and the loose swivel fulcrum effect of the guiding contact area, is subjected to a biasing torque that urges the slidable sidewall toward the floor of the weighing compartment, where said torque is supported by the border edge of the floor that faces the respective sidewall.

3. The draft protection device of claim 2, wherein the guide flank and/or the guide contact area is comprised of at least one roller arranged in the guide element.

4. The draft protection device of claim 2, wherein the recesses in the guide element are slot-shaped, and one end of each recess is open at a lateral edge of the guide element so that the sidewall can be hooked into the guide rails.

5. The draft protection device of claim 2, further comprising at least one locking device arranged in the guide element which, in the operating state of the draft protection device, hooks partially around at least one of the guide rails, so that the guide element can be separated from the guide rails only if the locking device is released.

6. The draft protection device of claim 1, wherein the guiding means comprises:
    a first guide rail and, parallel thereto, a second guide rail, the guide rails arranged at the side of the top cover that faces towards the slidable sidewall; and
    at least one guide element on the slidable sidewall, the at least one guide element having at least one rigidly supported first guide roller that supports the weight of the slidable sidewall on the first guide rail and constrains it from lateral movement, and a second guide roller that is held by a tiltable pivot and biased by an elastic element;
    wherein, the slidable sidewall is elastically biased toward the second guide rail by the tiltable second guide roller and is therefore subjected to a torque that urges the slidable sidewall toward the floor, said torque being supported by the border edge of the floor that faces the slidable sidewall.

7. The draft protection device of claim 1, further comprising a holder means connected to the top cover for holding the front wall in place.

8. The draft protection device of claim 7, wherein the holder means is located at a top cover border edge facing toward the front wall and further comprises:
    a holder arranged at each end of the top cover border edge, each holder having two seating grooves extending parallel to the top cover edge, a first seating groove having a pin contact area and a second seating groove having a pin-guiding flank;
    a pin block arranged at both corners of the front wall that face the top cover edge, each pin block having two pins that extend parallel to the top cover edge;
    wherein, in the operating state of the draft protection device, the pin contact area is oriented substantially in the vertical direction, the first pin lies against the pin contact area, and the second pin rests against the pin-guiding flank, wherein the slope angle of the pin-guiding flank relative to the vertical direction is selected so that:
        (a) the weight of the front wall is being supported; and
        (b) the front wall, due to its own weight and the loose swivel fulcrum effect of the pin contact area, is pushed toward the floor of the weighing compartment by a biasing torque, the torque being supported by the border edge of the floor that faces the front wall.

9. The draft protection device of claim 1, wherein at least one of the sidewalls is releasably connected to the top cover.

10. The draft protection device of claim 1, wherein the front wall is releasably connected to the top cover.

11. The draft protection device of claim 1, further comprising a sealing element arranged along at least one border edge of the floor and extending at least the length thereof, the sealing element selected from the group consisting of a glide strip, a sealing brush and a sealing roller.

12. The draft protection device of claim 1, wherein the top cover and at least one of the group consisting of the two sidewalls, the front wall, and the rear wall are vertically slidable relative to the floor.

13. The draft protection device of claim 12, further comprising at least one drive mechanism to provide vertical movement of the top cover.

14. The draft protection device of claim 1, further comprising at least one drive mechanism to provide horizontal movement of at least one sidewall.

15. The draft protection device of claim 1, wherein the device is adapted for installation to and use with a laboratory instrument selected from the group consisting of a balance, a dosage-dispensing instrument, and a pipetting apparatus.

16. A laboratory instrument including the draft protection device of claim 1, the laboratory instrument selected from the group consisting of a balance, a dosage-dispensing instrument, and a pipetting apparatus.

* * * * *